Figure 1:
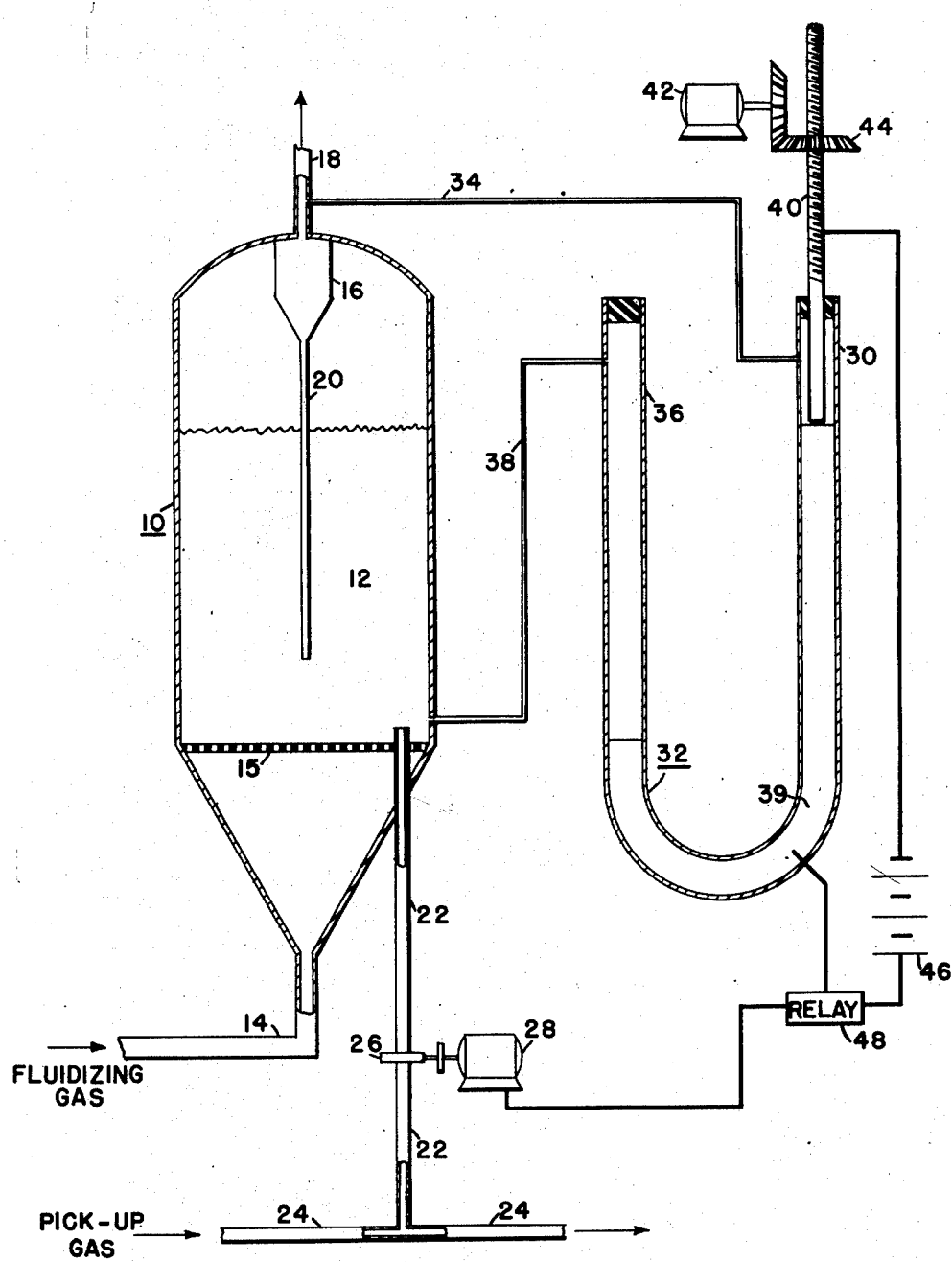

Patented Apr. 28, 1953

2,636,642

UNITED STATES PATENT OFFICE 2,636,642

DEVICE FOR CONTROLLING FLOW OF FINELY DIVIDED SOLIDS

Everett Gorin, Whitehall, Pa., assignor to Pittsburgh Consolidation Coal Company, Pittsburgh, Pa., a corporation of Pennsylvania Application March 4, 1950, Serial No. 147,590

5 Claims. (Cl. 222—58)

The present invention relates to the art of controlling the flow of finely divided solid particles.

For many purposes, it is desirable to transfer solids at a substantially constant rate. This is particularly true of chemical reactions where solid reactants are continuously fed to a reaction zone in predetermined relative proportions. The rate of flow of these reactants which are in liquid or gaseous form is easily controllable. But considerable difficulty has been experienced in regulating the flow of finely divided solids so that a constant predetermined amount may be continuously introduced into a reaction zone, thereby maintaining the proper relative proportions of the reactants for optimum results.

The primary object of this invention is to provide a method and apparatus for transferring finely divided solids at a constant rate.

Another object of this invention is to provide a method and apparatus for supplying a stream of finely divided solid particles to a reaction zone at a constant rate.

A still further object of the present invention is to provide a method and apparatus for draining a fluidized bed of solid particles at a constant rate.

According to my invention, the finely divided solids which are to be transferred to a given point, as for example a reaction zone, are maintained in a fluidized state by circulating a gas through a bed of solids under fluidizing conditions. A stream of the fluidized solids is withdrawn from the bed through a conduit having therein a variable size orifice valve. As the level of solids in the vessel drops, the pressure head on the solids in the conduit decreases with the result that the rate of flow of solids through the conduit would ordinarily progressively decline.

However, in accordance with my invention, the opening and closing of the orifice valve is regulated in response to the deviation of the actual pressure differential across the bed from the pressure differential which corresponds to a uniform and constant rate of solids withdrawal.

In the preferred embodiment of my invention, the actual pressure drop across the fluidized bed is indicated by a column of manometer fluid which descends as the level of the fluidized bed falls. Above the descending column of manometer fluid is arranged a travelling conducting element which is caused to descend at a constant predetermined rate. Engagement of the conducting element with the column of manometer fluid closes an electrical circuit which serves to effect opening of the orifice valve. Disengagement of the conducting element from the liquid breaks the electrical circuit which then serves to effect closing of the orifice valve. Thus the size of the opening of the orifice valve increases and decreases to permit the flow of solids at a rate corresponding to the predetermined rate established by the travelling conducting element. The rate can readily be changed to any desired rate by merely changing the speed at which the travelling conducting element descends. The withdrawn solids, flowing at a constant rate, are conveyed from the valved conduit to the treating zone.

Figure 2:
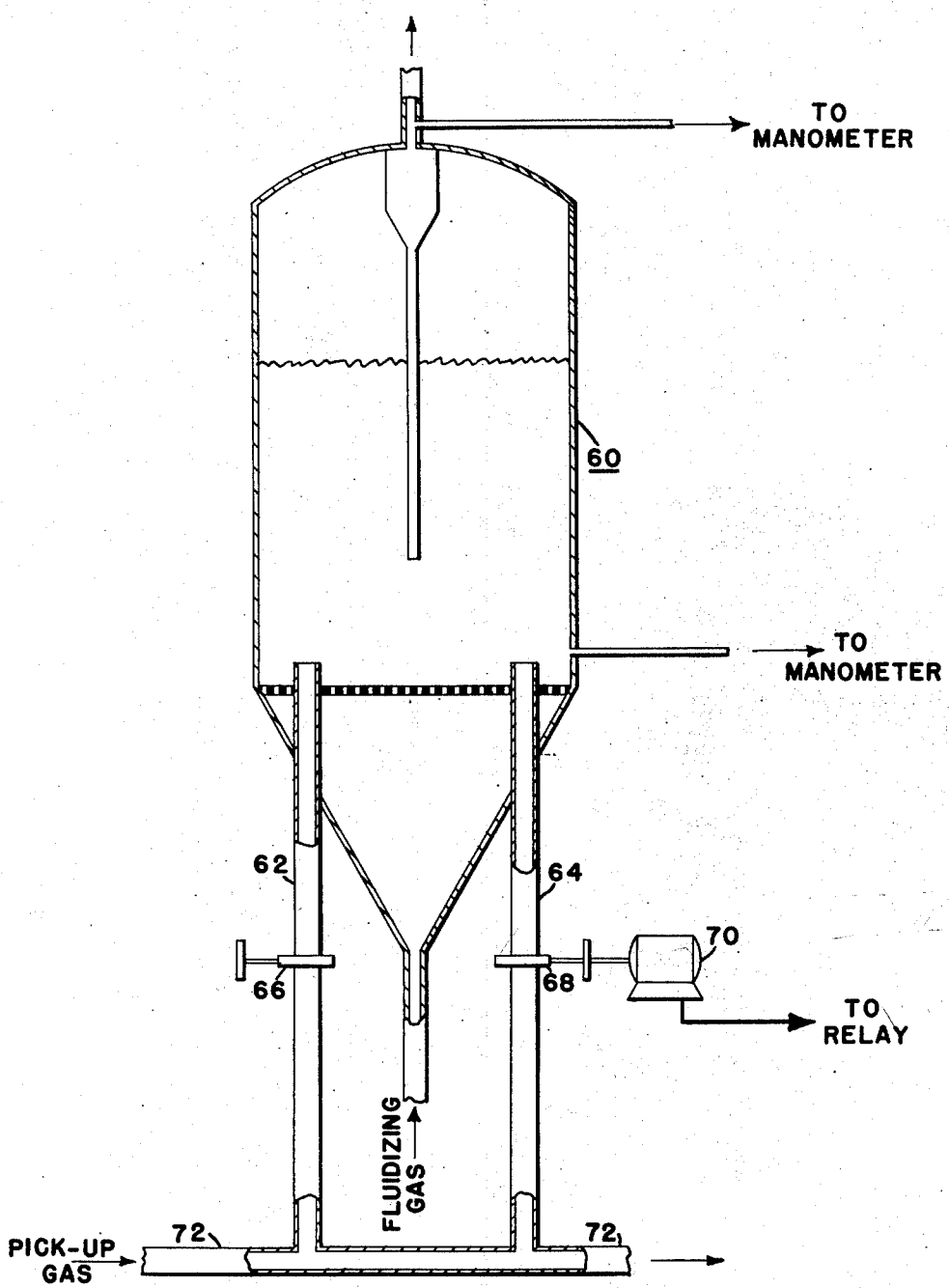

For a better understanding of my invention, its operation, other objects and advantages, reference should be had to the following detailed description and to the drawings, in which:

Figure 1 is a partly diagrammatic and partly sectional illustration of a preferred embodiment of this invention, and Figure 2 is an illustration partly diagrammatic and partly sectional of a modification of this invention.

Referring to Figure 1, a vessel 10, adapted to confine a fluidized bed of solid particles 12, is provided with an inlet conduit 14 for the introduction of fluidizing gases. A porous plate 16 is provided in the vessel to promote uniform distribution of the fluidizing gases. Gases leave vessel 10, through a cyclone 16 and an exit line 18. Solid particles entrained in overhead exit gases are returned to the bed 12 through a cyclone leg 20. A solids discharge conduit 22 connects the fluidized bed 12 with a solids transfer conduit 24. A variable orifice valve 26 is inserted into conduit 22 and is controlled by a continuously operating motor 28 of a reversing type in such a manner that the size of the orifice of valve 26 continuously increases or decreases according to the direction of rotation of the motor 28. The upper portion of reactor 10 is in open communication with one leg 30 of a manometer 32 through a pressure tap 34 and the lower end of reactor 10 is in open communication with the other leg 36 of manometer 32 through a pressure tap 38, so that the manometer 32 is thereby adapted to indicate the pressure drop across the fluidized bed 12. The manometer 32 contains a fluid 39 which is capable of conducting an electrical current. For example, liquid mercury or an aqueous solution of a strong electrolyte may be used.

Fitted into the low pressure leg 30 of manometer 32 is a rod 40 capable of conducting an electrical current. The electrically conducting rod 40 is in operative association with any convenient means capable of driving the rod 40 downwardly within the low pressure leg 30 of manometer 32 at a constant rate, such as small constant speed motor 42 and gear 44.

An electrical circuit is provided comprising a source of continuous low potential electromotive force, such as a battery 46 the electrically conducting rod 40, the manometer fluid 39 and a relay mechanism 48, shown schematically. Relay mechanism 48 is designed to be in an activated state when the electrically conducting rod 40 is in contact with the manometer fluid 39, thereby closing the electrical circuit. When the electrically conducting rod 40 is not in contact with the manometer fluid 39, the electrical circuit is broken and relay mechanism 48 is in an inactivated state.

When relay 48 is in its activated state, motor 28 rotates in a direction which increases the size of the orifice of valve 26. When relay 48 is in its inactivated state, motor 48 rotates in the opposite direction which decreases the size of the orifice of valve 26.

To operate the apparatus by the method of this invention a bed 12 of finely divided solid particles is supplied to vessel 10 by means not shown. Fluidizing gas from any convenient source is introduced into vessel 10 through conduit 14 at a linear velocity which should be somewhat greater than the minimum fluidizing velocity, but not so great that excessive entrainment from or slugging in the bed is encountered. The exact velocity employed will depend on the nature of the solids and their sizes consist but in most cases will lie in the range of 0.1–1.0 feet/second.

Manometer fluid 39 in manometer 32 indicates the pressure drop across the fluidized bed 12. The electrically conducting rod 40 is adjusted so that its tip just touches the surface of manometer fluid 39 in low pressure leg 30 of the manometer 32.

The orifice of valve 26 is set at an approximately half-open position. Simultaneously motor 28 and constant speed motor 42 are set into operation. Solids begin to flow from vessel 10 through discharge conduit 22 and through the orifice of valve 26. The rod 40 begins to descend in low pressure leg 30 of manometer 32.

Since the pressure drop across a fluidized bed is a direct measure of the weight of solids in the bed and also since the pressure drop across the bed is indicated directly by the height of a manometer column connected across the bed, when the bed is drained of solids at a constant rate, the manometer column measuring the pressure drop across the bed will descend at a constant rate.

Therefore, at any given level of the fluidized bed of solid particles in vessel 10, the manometer fluid 39 in the low pressure leg 30 will reach a definite height $H_1$, and when the desired quantity of solid particles has been drained from the bed 12, the height of the column of fluid will decrease to a value $H_2$. The value of $H_1-H_2$ then is the total change in height of the column corresponding to the withdrawal of the desired quantity of solid particles from vessel 10. If this quantity of solid particles is to be withdrawn at a constant rate, then the time required for the withdrawal is $$t = \frac{\text{wt. of solids withdrawn}}{\text{desired rate of withdrawal}}$$

The height of the column of manometer fluid 39 if the solids are drained uniformly from the bed 12 at the desired rate, will decrease at the uniform rate of $$\frac{H_1-H_2}{t}$$

The driving mechanism for the electrically conducting rod 40 is designed to move the rod downwardly within the low pressure leg 30 at the rate $$\frac{H_1-H_2}{t}$$

Thus, if the solids are withdrawn from the bed 12 continuously at the desired rate, the rod 40 will descend into the manometer leg 30 at the same rate at which the column of manometer fluid is descending in the same leg.

As solids are drained from vessel 10 through conduit 22 and valve 26, the motor 28 controlling the size of the orifice of valve 26 is turning in a direction such that the size of the orifice of valve 26 is continuously increasing because the electrically conducting rod 40 is in contact with the manometer fluid 39 and the electrical circuit is closed causing the relay 48 to be in its activated state. However, because the orifice is continuously increasing, solids are being withdrawn from vessel 10 at an increasing rate, so that the column of manometer fluid is descending at a rate which exceeds the rate of descent of the rod 40. Ultimately the column of manometer fluid will pull away from the rod 40 and break the electrical circuit causing the relay 48 to become inactivated. In its inactivated state, the relay 44 causes the motor 28 to move in a reverse direction and decrease the size of the orifice opening. Correspondingly, the rate at which solids are withdrawn from vessel 10 decreases and the rate at which the column of manometer fluid descends will decrease until the rod 40, moving at a constant speed throughout, will make a contact with the manometer fluid, thereby closing the electrical circuit and activating relay 48. This cycle of operation will be repeated automatically until substantially all the desired solid particles have been withdrawn from the vessel 10.

It will be observed that the instantaneous rate of solids withdrawal can vary within limits which are dependent upon the physical design of the manometer, the relay, the motor of the valve and the valve itself. However, the rate of solids withdrawn averaged over any appreciable time interval will be a reproducible constant determined by the rate at which the electrically conducting rod 40 is driven downwardly into the low pressure manometer leg.

To secure a greater sensitivity in the operation of my invention as a means of controlling flow rates, it may be desirable to lengthen the distance through which the top of the column of manometer fluid moves while the bed is being discharged. It is obvious, of course, that the total change in height of an aqueous salt solution will be about 13.6 times the change occurring when mercury is used as the manometer fluid. But for a given fluid, the sensitivity of the method of my invention can be improved by providing a high pressure manometer leg with a diameter several times greater than that of the low pressure leg. Also the low pressure leg may be inclined from a vertical position to increase the change in column length.

Since the pressure drop across any bed of fluidized solids is subject to sudden surges, the effect of these pulses on the operation of the feeding method of my invention should be minimized by one of several methods. For example, it is possible to minimize the effect of a sudden pressure change in the fluidized vessel 10 caused by bed slugging or channeling on the height of manometer fluid by establishing a constriction in the manometer between the low pressure and the high pressure legs. Or the relay mechanism may be of a slow acting type, requiring a positive and continued change in input impulse before becoming activated or inactivated as the case may be.

It should be pointed out further that the constant rate of withdrawing solids from the fluidized bed can be changed to a different constant rate by changing the constant speed at which the electrically conducting rod descends within the low pressure manometer leg to a correspondingly different speed.

Alternately, instead of using a variable orifice valve with a reversing motor to achieve control over the rate of solids withdrawal, it is possible to use a simple open-and-shut position valve in withdrawal line 22, or such that when relay mechanism 49 is in its activated state, the valve is in its open position, and, when the relay mechanism is inactivated, the valve is closed.

A still different variation is in the use of a two-position valve in withdrawal conduit 22 such that in one position, the orifice of the valve is of such size that solids are withdrawn at an average rate exceeding the desired rate, but in the other position, the solids are withdrawn at an average rate which is less than the desired rate.

In the modification of my invention shown in Figure 2, a fluidized vessel 60 is fitted with two discharge conduits 62 and 64. A manually adjustable valve 66 is inserted in conduit 62 and is positioned so that its orifice will permit the passage of solid particles through conduit 62 at slightly less than the desired withdrawal rate, for example, about 90 per cent of the desired rate. Conduit 64 is a compensating withdrawal line and is fitted with a valve 68 operated by a reversing motor 70 which will permit the passage of solid particles at a rate varying from zero in its closed position to about 30 per cent of the desired bed withdrawal rate in its fully open position.

Solids are discharged continuously from vessel 60 through conduit 62, are picked up by a stream of carrying gas in conduit 72 and transported, suspended in carrier gas, through conduit 72. Additional solids are discharged from vessel 60 through conduit 64 to compensate for the difference between the rate at which solids discharge through conduit 62 and the desired withdrawal rate. The motor 70 controlling the orifice of valve 68 is itself controlled by a relay mechanism of the type and in the manner described in connection with the apparatus of Figure 1.

Thus, it is possible to provide any number of discharge conduits from the fluidized vessel and all or any number of these conduits may be fitted with controlled valves in accordance with my invention.

It should be evident that the method and apparatus of this invention can be reversed. That is, the electrically conducting rod can be inserted into the high pressure leg of the manometer and caused to rise at a constant rate within said high pressure leg during the solids withdrawal period. If the high pressure leg is used as the control point, it will be necessary to reverse the operation of the relay mechanism controlling the motor on the variable orifice valve in the discharge conduit.

The method and apparatus of my present invention, although contemplated primarily for use in feeding solid particles at a constant rate at substantially atmospheric pressure, can nevertheless be used to control the flow of solid particles at elevated pressures. Moreover, the operation of apparatus according to my method is independent of the temperature of the solid particles whose feed rate is to be controlled.

Since the withdrawal operation, according to my invention, is necessarily batchwise, an installation of two or more units can be provided to function in parallel in a cyclical manner to provide overall a continuous stream of solid particles at a constant rate.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. An apparatus for feeding at a constant rate finely divided particles of solid material from a fluidized bed through a variable orifice valve into a gas stream which comprises in combination a manometer containing an electrically conducting manometer fluid and which is adapted to indicate the pressure drop across said fluidized bed, an electrically conducting rod, means for driving said rod downwardly at a constant rate within the low pressure leg of said manometer in a direction coextensive with the direction of descent of said manometer fluid, and an electrical circuit comprising said electrically conducting rod, said manometer fluid, a source of continuous low potential electromotive force and a relay, said relay being adapted to increase the size of the orifice of said variable orifice valve when said electrical circuit is closed and to decrease the size of said orifice when said electrical circuit is broken.

2. An apparatus for withdrawing solid particles at a constant rate from a fluidized bed of finely divided solid particles which comprises a conduit communicating with said fluidized bed, means for varying the flow of solid particles from said fluidized bed through said conduit, means for measuring the pressure drop of the fluidizing gas through said fluidized bed, means for indicating the pressure drop of a fluidizing gas through said fluidized bed corresponding to a predetermined uniform withdrawal of solids from said bed, and an electrical circuit responsive to deviations between said measured pressure drop and said indicated pressure drop, said electrical circuit being adapted to regulate said means for varying the flow of solid particles in accordance with said deviations.

3. An apparatus for feeding at a constant rate finely divided particles of solid material from a fluidized bed of said solid particles, comprising a conduit communicating with said fluidized bed, a motor operated variable orifice valve in said conduit, a manometer adapted to indicate the pressure drop across said fluidized bed, said manometer containing an electrically conducting manometer fluid, an electrically conducting rod, means for driving said rod downwardly within the low pressure leg of said manometer at a constant speed, an electrical circuit comprising said manometer fluid, said rod, a source of low potential electromotive force and a relay, said relay adapted to be activated when said rod is in contact with said manometer fluid and adapted in its activated state to drive the motor of said motor operated valve in a direction which increases the size of the orifice of said motor operated valve, said relay also adapted to be in an inactivated state when said rod is not in contact with said manometer fluid and adapted in its inactivated state to operate said motor on said motor operated valve in a direction which decreases the size of the orifice of said variable orifice valve.

4. An apparatus for withdrawing solid particles at a constant rate from a fluidized bed of finely divided solid particles which comprises a plurality of conduits communicating with said bed, means for varying the flow of solid particles through at least one of said conduits, means for measuring the pressure drop of the fluidizing gas through said fluidized bed, means for indicating the pressure drop of a fluidizing gas through said fluidized bed corresponding to a predetermined uniform withdrawal of solids from said bed, and an electrical circuit responsive to deviations between said measured pressure drop and said indicated pressure drop, said electrical circuit being adapted to regulate said means for varying the flow of solid particles in accordance with said deviations.

5. An apparatus for feeding at a constant rate finely divided particles of solid material from a fluidized bed of said solid particles, comprising a conduit communicating with said fluidized bed, a valve having a variable orifice for varying the flow of solids through said conduit, a manometer adapted to indicate the pressure drop of the fluidizing gases through said fluidized bed, said manometer containing an electrically conducting manometer fluid, an electrically conducting rod, means for driving said rod downwardly within the low pressure leg of said manometer at a constant speed, an electrical circuit comprising said manometer fluid, said rod, and a source of low potential electromotive force, said electrical circuit being operatively associated with said valve to regulate the flow of solids through said conduit in accordance with the deviations between the height of manometer fluid and the level of said rod.

EVERETT GORIN.

References Cited in the file of this patent

UNITED STATES PATENTS

| Number | Name | Date |
|---|---|---|
| 998,647 | Smith | July 25, 1911 |
| 1,212,168 | Cornish | Jan. 16, 1917 |
| 1,628,404 | Heuermann | May 10, 1927 |
| 1,664,265 | Rieber | Mar. 27, 1928 |
| 1,983,093 | Montgomery | Dec. 4, 1934 |
| 2,475,984 | Owen | July 12, 1949 |
| 2,502,953 | Jahnig | Apr. 4, 1950 |